Aug. 14, 1928.
G. WEBER
1,680,829
TROLLEY GUARD
Filed April 20, 1927
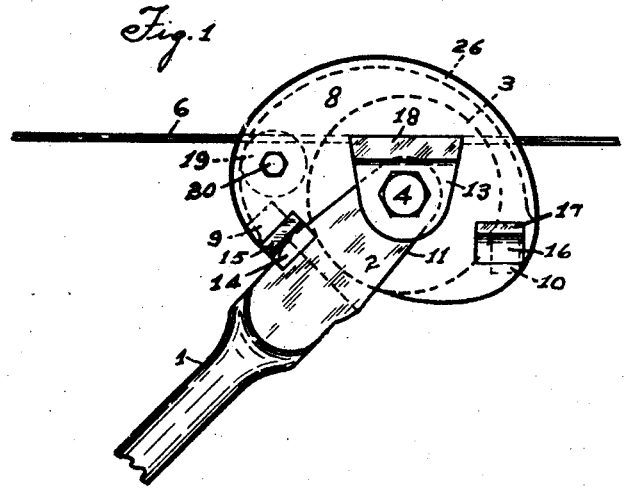
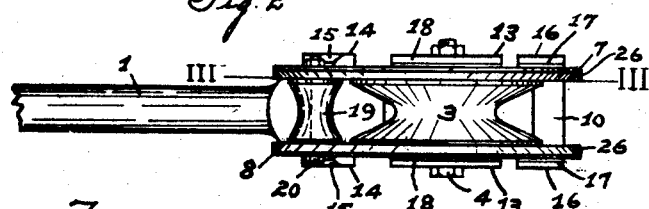
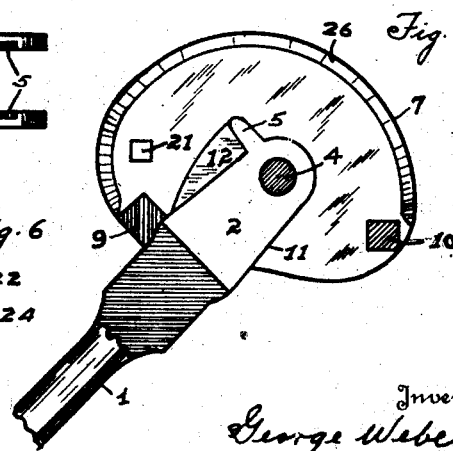
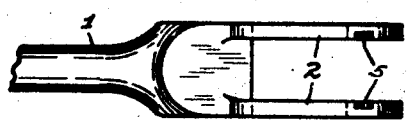
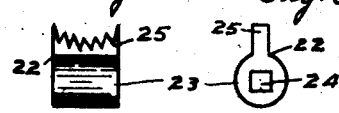
Inventor
George Weber
Jack R Snyder
By
Attorney Patented Aug. 14, 1928.

1,680,829

UNITED STATES PATENT OFFICE.

GEORGE WEBER, OF PITTSBURGH, PENNSYLVANIA.

TROLLEY GUARD.

Application filed April 20, 1927. Serial No. 185,110.

My invention relates broadly to trolleys but more particularly to a guard therefor, and important objects of the invention are to provide a trolley guard of the character described, which will effectively maintain the trolley in engagement with the trolley wire under all normal conditions, which may be readily attached to the trolley mechanism now commonly employed without altering the latter in any manner, which requires no additional materials except that embodied in the invention itself, and which may be conveniently positioned to the trolley wire or removed therefrom.

Further objects of the invention are to provide a device of the type stated which is simple in its construction and arrangement, strong, durable and efficient in its use, compact, light in weight, positive in its action, and comparatively inexpensive to manufacture and install.

With the foregoing and other objects in view which will appear as the description proceeds, the invention resides in the combination and arrangement of parts, as shown in the drawing hereinafter referred to, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a side elevational view of a trolley provided with a guard constructed in accordance with the invention.

Figure 2 is a top plan view thereof.

Figure 3 is a sectional view on line III—III, Figure 2.

Figure 4 is a plan view of the bifurcated free end of an ordinary trolley pole.

Figures 5 and 6 are, respectively, side and end views of a sleet cutter adapted for use in connection with the trolley guard.

Referring in detail to the drawing 1 denotes a trolley pole provided with a bifurcated or forked free end, which comprises a pair of spaced, flat, parallel disposed bearing plates 2 for the reception of the grooved trolley wheel 3 rotatably mounted therebetween by means of the transversely disposed axle bolt 4. Each of the bearing plates 2 is provided with an integrally formed short arm 5, which is disposed on the upper side edge thereof, at right angles relatively to the trolley pole 1, and in radial alignment with the axial center of the axle bolt 5, for the purpose of preventing the potential engagement of the trolley wire 6 between the bearing plates 2 and the trolley wheel 3 when the latter accidentally leaves the trolley wire 6.

The construction and arrangement of the bearing plates 2, of the associated arms 5, and of the trolley wheel 3, as above described, are identical to the construction and arrangement of trolley structures now commonly employed, and my improved trolley guard is adapted for connection to the trolley device as now used in practice, without alteration of the latter in any manner.

The trolley guard consists of a pair of flat, substantially hook shaped guard plates respectively indicated at 7 and 8 which are spaced from each other but joined together by a pair of transversely disposed, integrally formed cross-bars, respectively indicated at 9 and 10.

Each of the guard plates 7 and 8 is formed with an open slot 11. The contour of the latter conforms to the configuration of the bearing plates 2, the edges of which are overlapped by slot walls of respective guard plates 7 and 8. The thickness of the guard plates 7 and 8 is commensurate to the thickness of the bearing plates 2, and the spaced relation of the former corresponds to the spaced relation of the latter. The inner side face of each of the guard plates 7 and 8 is suitably recessed, as at 12, to provide suitable clearance for the bearing plate arms 5 to allow the mounting of the trolley guard on the bearing plates 2.

The outer side faces of the guard plates 7 and 8, are provided with integrally formed, depending bearing brackets 13, which overlap the closed ends of the slots 11 and the free ends of the bearing plates 2, mounted in the latter. The axle bolt 4 extends through the bearing brackets 13 and fixedly secures the trolley guard to the bearing plates 2.

A lug 14, provided with a bevelled top edge 15, is formed integral with the outer face of each of the guide plates 7 and 8. The lug 14 is disposed at the open end of the slots 11 and depends below the top wall of the latter to overlap the outer side face of the bearing plates 2, as clearly shown in Figure 1.

The cross bar 9 connects the guard plates 7 and 8 forwardly of the trolley wheel 3, and the other cross-bar 10 connects the same rearwardly of the trolley wheel 3. The cross-bar 9 seats on the trolley pole 1 at its point of juncture with the bearing plates 2, as shown in Figure 3.

The engagement of the bearing brackets 13, with the bearing plates 2, together with the engagement of the latter by the lugs 14 and cross-bar 9, in the manner stated, provides a rigid connection of the trolley guard with the bearing plates 2.

A lug 16, having a bevelled top edge 17, is formed integral with the outer face of each of the guide plates 7 and 8 and is disposed adjacent to the rear ends of the latter. The bearing brackets 13 are also formed with bevelled top edges 18, which latter, in conjunction with the bevelled top edges 15 and 17, of respective lugs 14 and 16, are adapted to prevent the lodging of the trolley wire 6 against the plates 7 and 8 in the event that the trolley wire 6 should accidentally happen to escape or leave the trolley wheel 3.

A trolley roller 19 is rotatably carried on a transversely extending bolt 20 which is mounted against rotation in the square aperture 21 formed in the guide plates 7 and 8. The roller 19 is disposed forwardly of the trolley wheel 3 and has its contacting periphery disposed below the plane of the contacting periphery of the trolley wheel 3, so that normally the trolley wire 6 will not contact with the roller 19.

The trolley roller 19 is intended for emergency use when the trolley wheel 3 is broken. This arrangement permits of the successful temporary use of the trolley structure without the employment of the trolley wheel 3, and obviates the necessity of towing service now required when the trolley apparatus is so disabled.

Figures 5 and 6, illustrate a sleet cutter 22, which consists of a bearing 23 provided with a square bore 24, and an integrally formed, vertically extending cutter member 25, disposed on the top of its bearing 23. The sleet cutter 22 is adapted to be fixedly mounted on a square shaft in the position normally occupied by the trolley roller 19, which latter would, of course, be removed from guard plates 7 and 8. During the travel of the trolley the cutter member 25 travels along the under side of the trolley wire 6, in close proximity to the latter and will efficiently remove all sleet clinging thereto.

The peripheral edges of the guard plates 7 and 8 are bevelled at their inner side margins, as indicated at 26, to facilitate the mounting of the trolley wheel 3 against the under side of the trolley wire 61 in the usual manner.

While illustrating and describing my improved trolley guard as being connected to the bearing plates 2 of a trolley structure as now commonly constructed and arranged, it will be obvious that the principle of my invention may be embodied in a unitary structure wherein the bearing plates 2 form an integral part of the plates 7 and 8.

The guard plates 7 and 8 extend beyond the periphery of the upper portion of the trolley wheel 3, and will prevent the escape of the latter from the trolley wire 6 under all normal conditions, even when the vehicle equipped therewith, is turning a sharp corner, at which time the trolley is most apt to leave the trolley wire under ordinary conditions. Further, my improved trolley guard will not retard or impede the removal of the trolley from the trolley wire, in the usual manner when required.

What I claim is:

1. In a trolley of the character described, the combination with a trolley pole having a bifurcated free end and a trolley wheel journaled for rotation in the latter, of a pair of guard plates carried by said bifurcated free end and disposed at respective sides of said trolley wheel, said guard plates extending beyond the periphery of the upper portion of said trolley wheel, and a trolley roller rotatably mounted in said pair of guard plates and having its contacting periphery normally disposed below the contacting periphery of said trolley wheel.

2. In a trolley of the character described, the combination with a trolley pole having a bifurcated free end and a trolley wheel journaled for rotation in the latter, of a pair of guard plates carried by said bifurcated free end and disposed at respective sides of said trolley wheel, said guard plates extending beyond the periphery of the upper portion of said trolley wheel, the peripheral edges of said guard plates being bevelled on the inner side margins of the latter, and a trolley roller rotatably mounted in said pair of guard plates and having its contacting periphery normally disposed below the contacting periphery of said trolley wheel.

3. In a trolley of the character described, the combination with a trolley pole provided at its free end with a pair of spaced bearing plates and a trolley wheel rotatably mounted on an axle bolt between said pair of spaced bearing plates, of a pair of flat substantially hook-shaped guard plates respectively engaging and overlapping the edges of said pair of bearing plates, each of said pair of guard plates provided with a bearing bracket engaged by said axle bolt, said pair of guard plates extending beyond the periphery of said trolley wheel and having their peripheral edges bevelled on the inner side margins thereof, and a revoluble trolley roller detachably mounted in said pair of guard plates and disposed forwardly of said trolley wheel, the contacting periphery of trolley roller being normally disposed below the contacting periphery of said trolley wheel.

4. In a trolley of the character described, the combination with a trolley pole provided at its free end with a pair of flat, spaced bearing plates, and a trolley wheel rotatably mounted on an axle bolt between said pair of bearing plates; of a pair of flat, substantially hook-shaped guard plates, respectively engaging and overlapping the edges of said pair of bearing plates; a pair of cross-bars integrally joining said pair of guard plates together; each of said pair of guard plates provided with a bearing bracket engaged by said axle bolt; said pair of guard plates extending beyond the periphery of said trolley wheel and having their peripheral edges bevelled on the inner side margins thereof; and a revoluble trolley roller detachably mounted in said pair of guard plates and disposed forwardly of said trolley wheel; the contacting periphery of said trolley roller being normally disposed below the contacting periphery of said trolley wheel: one of said pair of cross-bars seating on the trolley pole, substantially as described and for the purpose set forth.

In testimony whereof I affix my signature.

GEORGE WEBER.